United States Patent
Groarke (10) Patent No.: US 11,200,573 B2
(45) Date of Patent: Dec. 14, 2021

(54) METHODS AND SYSTEMS FOR IOT ENABLED PAYMENTS

(71) Applicant: Mastercard International Incorporated, Purchase, NY (US)

(72) Inventor: Peter Groarke, Dublin (IE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 698 days.

(21) Appl. No.: 15/841,588

(22) Filed: Dec. 14, 2017

(65) Prior Publication Data

US 2018/0197175 A1    Jul. 12, 2018

(30) Foreign Application Priority Data

Jan. 6, 2017    (EP) .................................. 17150569

(51) Int. Cl.
*G06Q 20/40* (2012.01)
*G06Q 30/06* (2012.01)
(Continued)

(52) U.S. Cl.
CPC ........... *G06Q 20/401* (2013.01); *G06Q 20/12* (2013.01); *G06Q 20/208* (2013.01);
(Continued)

(58) Field of Classification Search
CPC .............................. G06Q 20/18; G06Q 20/401
See application file for complete search history.

(56) References Cited

U.S. PATENT DOCUMENTS 9,292,850 B2 *    3/2016    Patterson .............. G06Q 20/385
10,535,077 B2 *   1/2020    Enriquez ............ G06Q 30/0226
(Continued)

OTHER PUBLICATIONS

Wikipedia, "Order Fulfillment", https://en.wikipedia.org/w/index.php?title=Order_fulfillment&oldid=756001347, Dec. 2016 (Year: 2016).*

(Continued)

*Primary Examiner* — Ryan D Donlon
*Assistant Examiner* — Mark A Malkowski
(74) *Attorney, Agent, or Firm* — Buckley, Maschoff & Talwalkar LLC (57) ABSTRACT

The present disclosure relates to methods and systems for placing and processing a payment transaction for an order for one or more products. A method of processing a payment transaction for an order for one or more products is provided. The method comprises: receiving an authorization request message comprising: a token PAN associated with a payment account and with an electronic device configured to detect the presence of the one or more products. It is determined that the payment transaction should be processed according to a delayed clearing protocol. A clearing presentment file comprising at least one clearing presentment message is received. The payment transaction is processed according to a delayed clearing protocol by determining whether the network server has received a receipt message from the electronic device and, if not, returning an error message to the first financial intuition indicating that the clearing presentment message has been rejected.

4 Claims, 5 Drawing Sheets

(51) Int. Cl.
  *G06Q 20/32* (2012.01)
  *G06Q 20/38* (2012.01)
  *G06Q 20/42* (2012.01)
  *G06Q 20/20* (2012.01)
  *G07G 1/00* (2006.01)
  *G06Q 20/12* (2012.01)
  *G06Q 20/30* (2012.01)

(52) U.S. Cl.
  CPC ....... *G06Q 20/308* (2020.05); *G06Q 20/3223* (2013.01); *G06Q 20/385* (2013.01); *G06Q 20/389* (2013.01); *G06Q 20/40* (2013.01); *G06Q 20/405* (2013.01); *G06Q 20/42* (2013.01); *G06Q 30/06* (2013.01); *G07G 1/0081* (2013.01)

(56) References Cited

U.S. PATENT DOCUMENTS

| | | | |
|---|---|---|---|
| 2002/0161707 A1* | 10/2002 | Cole | G06Q 40/00 705/42 |
| 2007/0282743 A1* | 12/2007 | Lovelett | G06Q 20/10 705/40 |
| 2008/0314977 A1 | 12/2008 | Domenica et al. | |
| 2013/0131862 A1* | 5/2013 | Jefferies | G07F 11/62 700/235 |
| 2014/0058805 A1* | 2/2014 | Paesler | G06Q 20/18 705/13 |
| 2014/0156427 A1* | 6/2014 | Grigg | G06Q 20/023 705/17 |
| 2014/0222533 A1* | 8/2014 | Ovick | G06Q 30/0283 705/14.23 |
| 2015/0026070 A1 | 1/2015 | Groarke et al. | |
| 2015/0178753 A1 | 6/2015 | Matthews et al. | |
| 2015/0199679 A1 | 7/2015 | Palanisamy et al. | |
| 2016/0019545 A1 | 1/2016 | Vastenavondt et al. | |
| 2016/0171479 A1* | 6/2016 | Prakash | G01D 4/004 705/44 |
| 2016/0247143 A1* | 8/2016 | Ghosh | G06Q 20/3226 |
| 2016/0321659 A1* | 11/2016 | Annesley-DeWinter | G06Q 10/103 |
| 2017/0076288 A1* | 3/2017 | Awasthi | H04L 63/10 |
| 2019/0378137 A1* | 12/2019 | Honey | G06Q 20/24 |

OTHER PUBLICATIONS

Extended EP Search Report for EP Application No. 17150569.6 dated Feb. 21, 2017, 10 pp.

PCT International Search Report and Written Opinion for PCT International Application No. PCT/US17/64155 dated Feb. 20, 2018, 10 pp.

* cited by examiner

METHODS AND SYSTEMS FOR IOT ENABLED PAYMENTS

CROSS-REFERENCE TO RELATED APPLICATION

This application is a U.S. National Stage filing under 35 U.S.C. § 119, based on and claiming benefits of and priority to European Patent Application No. 17150569.6 filed on Jan. 6, 2017. The entire disclosure of the above application is incorporated herein by reference.

FIELD OF INVENTION

The present disclosure relates to methods and systems for placing and processing a payment transaction for an order for one or more products. In particular, an aspect relates to a method and system for placing and processing orders for a product in which the processing of the payment is delayed until the product has been successfully received.

BACKGROUND

The field of payment card transaction processing is well equipped to deal with successful transactions in which all parties involved fulfil their respective obligations. In such examples, a merchant is provided by his financial institution (the acquiring institution) with rapid authorization to provide a customer with goods, with the transfer of money between accounts being arranged and conducted between the financial institutions during the following days.

Afar more complicated situation occurs when a transaction is authorized by a financial institution, yet transfer of goods from a merchant to a customer is not successfully completed, such as when an order made at an online merchant does not arrive as expected. Due to the independent processes for the transfer of goods between a merchant and a customer and the payment processing between financial institutions, the failure of goods to be successfully delivered does not necessarily prevent the completion of the payment for the goods. In order to prevent a payment in such circumstances, the cardholder or the financial institution of the card holder (the issuing institution) is required to intervene to prevent or reverse the payment. This can require significant human involvement, especially so during arbitration processes and dispute settlements. Furthermore, the requirement to exchange data relating to two unnecessary transactions (the incorrect transaction and the further transaction to reverse the incorrect transaction) places an unnecessary burden on the communication and processing systems of both the issuing and acquiring institutions, as well as the payment network provider that acts as an intermediary between the two institutions.

There is a need, therefore, for a payment system that does not require the intervention of a card holder or financial institution to reverse the payment when an order is not successfully completed.

SUMMARY OF INVENTION

According to a first aspect, there is provided a method of processing a payment transaction for an order for one or more products, the method comprising: receiving, at a network server, from a server of a first financial institution, an authorization request message for authorization of the payment transaction, the authorization request comprising: a token primary account number, "PAN", associated with a payment account at a second financial institution and with an electronic device configured to detect the presence of the one or more products; determining, based on the token PAN, that the payment transaction should be processed according to a delayed clearing protocol by: accessing a database comprising a plurality of token PANs associated with the delayed clearing protocol, and determining that the token PAN is one of the plurality of token PANs in the database; receiving, at the network server, from a server of the first financial institution, a clearing presentment file comprising at least one clearing presentment message, the clearing presentment message comprising details of the payment transaction; and processing the payment transaction according to a delayed clearing protocol by: determining whether the network server has received a receipt message from the electronic device indicating that the sensor of the electronic device has detected the presence of the one or more products; and upon determining that the network server has not received the message indicating that the sensor of the electronic device has detected the presence of the one or more products, returning an error message to the first financial intuition indicating that the clearing presentment message has been rejected.

The above method allows for completion of a payment to be delayed until receipt of a physical product has been detected at a storage device. The use of a single technical system that can perform ordering, storage and payment processes allows previously distinct aspects of a payment transaction for an order to be combined on a technical level. This removes the burdensome computing processing previously required to reverse incorrectly processed payments.

Preferably, the method further comprises: receiving, at the network server, a message from the electronic device indicating that the sensor of the electronic device has detected the presence of the one or more products; and sending the clearing presentment message to a server of the second financial institution.

Preferably, the method further comprises: receiving, at the network server, a receipt message from the electronic device indicating that the sensor of the electronic device has detected the presence of the one or more products; sending a confirmation message, from the network server, to the server of the first financial institution, requesting that the payment transaction be included in a further clearing presentment message, receiving, at the network server, from the server of the first financial institution, a further clearing presentment file comprising the clearing presentment message, wherein the further clearing presentment message comprises details of the payment transaction; and sending the clearing presentment file to a server of the second financial institution for settlement.

According to a second aspect, a system is provided comprising a communication node, memory having a database stored thereron, and a processor configured to perform the steps the first aspect.

According to a third aspect, there is provided a method of initiating and completing a payment transaction for an order for one or more products using an electronic device comprising a sensor configured to detect the presence of the one or more products, the method comprising: sending, using an internet communication node of the electronic device, to a merchant server, payment details comprising a token primary account number, "PAN", for authorization of the payment transaction, wherein the token PAN is pre-configured to be processed at a network server according to a delayed clearing protocol, in which the network server delays the completion of the payment transaction until the network server has received the confirmation message indicating that the one or more products has been detected by the sensor; detecting, using the sensor, the presence of the one or more products, wherein detecting the presence of the one or more products comprises: obtaining data measurements from the sensor of the electronic device; and determining that the data measurements correspond to product characteristic data stored on the electronic device, wherein the product characteristic data indicates an expected value of the data measurement corresponding to the one or more products, sending, using an internet communication node of the electronic device, to a network server, a receipt message indicating that the one or more products has been detected by the sensor and that the payment transaction is to be completed.

Preferably, the method further comprises: sending, from the electronic device, to the network server, a token PAN provisioning request comprising: a funding PAN, a device identifier identifying the electronic device, and an indication that payments made using the token PAN should be processed according to the delayed payment protocol in which the network server delays the completion of the payment transaction until it has received the confirmation message indicating that the one or more products has been detected by the sensor; and receiving, from the network server, the token PAN.

Preferably, the method further comprises: receiving, at the electronic device, from the merchant server, product characteristic data characterizing the one or more products, thereby allowing the one or more products to be identified by comparison with data measurements from the sensor.

Preferably, the product characteristic data comprises one or more of: weight data corresponding to a weight of the one or more products, volume data corresponding to a volume of the one or more products, number data corresponding to a number of constituent parts of the one or more products, bar-code data corresponding to a bar-code on the one or more products, QR-code data corresponding to a QR-code tag on the one or more products, or RFID data corresponding to an RFID tag on the one or more products.

Preferably, the method further comprises initiating, from the electronic device, by communicating with the merchant server, the order for the one or more products, wherein the order is initiated based on a pre-determined criteria, wherein the pre-determined criteria is one of: a pre-determined time having elapsed since a previous order; the current time and date being equal to a pre-determined time and date; or the removal of an item being detected by the sensor of the electronic device.

According to a fourth aspect, there is provided a method of initiating and delaying a payment transaction for an order for a first product using an electronic device comprising a sensor configured to detect the presence of the first product, the method comprising: sending, using an internet communication node of the electronic device, to a merchant server, payment details comprising a token primary account number, PAN, for authorization of the payment transaction, wherein the token PAN is pre-configured to be processed at a network server according to a delayed clearing protocol, in which the network server delays the completion of the payment transaction until it has received the confirmation message indicating that the first product has been detected by the sensor; detecting, using the sensor, the presence of a second product, wherein detecting the presence of the second product comprises: obtaining data measurements from the sensor of the electronic device; and determining that the data measurements do not correspond to product characteristic data stored on the electronic device, wherein the product characteristic data indicates an expected value of the data measurement corresponding to the first product, sending, using an internet communication node of the electronic device, to the merchant server, a non-receipt message indicating that the second product has been detected by the sensor, rather than the first product.

According to a fifth aspect, an electronic device is provided comprising a sensor and an internet communication node, the electronic device being configured to execute the method of the third or fourth aspect.

Preferably, the device is a smart storage device, comprising a storage compartment suitable for storing the product.

Preferably, the smart storage device is a smart fridge and the storage compartment is a refrigerated compartment; or the smart storage device is a vehicle and the storage compartment is a fuel container.

Preferably, the sensor is one or more of one or more of a QR-code reader, a bar-code reader, scales, a camera, a photo-electric cell, and an RFID reader.

BRIEF DESCRIPTION OF THE FIGURES

Aspects of the present invention will now be described by way of example with reference to the accompanying figures. In the figures.

DETAILED DESCRIPTION

The following description is presented to enable any person skilled in the art to make and use the system, and is provided in the context of a particular application. Various modifications to the disclosed embodiments will be readily apparent to those skilled in the art.

The following disclosure provides systems and methods in which the means for placing an order, providing payment for the order, processing the payment and receiving the order are integrated in a single technical system that forms part of the Internet of Things.

Specifically, the system provides for methods of placing orders and processing payments for the orders wherein completion of the payment is delayed until receipt of a physical product has been detected by the system. The use of a single technical system that can perform the above processes allows previously distinct aspects of a payment transaction for an order to be related to one another on a technical level, rather than legally or in accordance with custom. This is advantageous over previously known methods of processing payments for orders because it removes the need for human interpretation of events and the relationships between entities. It also removes the burdensome computing processing previously required to reverse incorrectly processed payments.

An example of a system that can advantageously combine the above processes is a server of a payment network provider that is able to communicate with an internet enabled smart storage device, such as a smart refrigerator, that is configured to make payments. By way of background, relevant details of known payment processing systems and smart storage devices are explained below. The specification will go on to describe how these are combined in an integrated system.

While the disclosure below refers to examples comprising specific smart storage systems, such as smart refrigerators, it will be understood by the skilled person that a smart storage device can refer to any internet enabled device that is capable of storage that the methods of the disclosure can modified for use different smart storage devices. Thus, an internet enabled automobile may function as smart storage for fuel and an internet enabled crate may function as a more generic smart storage device.

Figure 1:
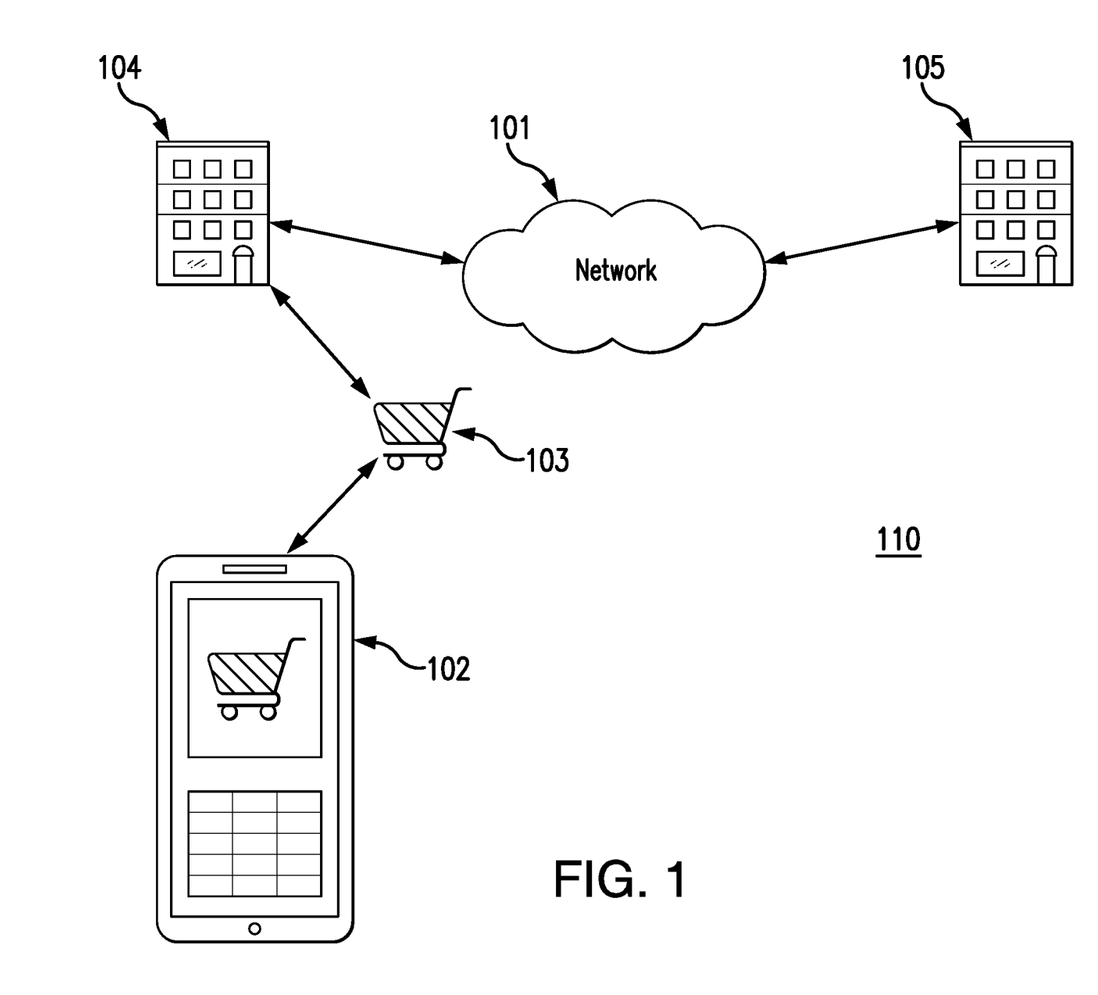
FIG. 1 is a schematic representation of entities involved in a payment transaction.

FIG. 1 depicts an operating model of the parties involved when a payment device 102 is used to perform a transaction over a four-party payment system. In the context of the present disclosure, the payment device 102 is an electronic device, such as a smart storage device, that is able to securely communicate with the server of an online merchant 103 to provide payment details that correspond to or can be mapped onto the details of a payment card.

The merchant 103 typically has a contract with a financial institution to accept payments from payment cards or payment devices 102 that are able to communicate payment details corresponding to the details of a payment card. That financial institution (i.e. the merchant's bank) is the acquiring institution 104. The issuing institution 105 (i.e. the customer's bank) is the financial institution that has issued a payment card to a particular customer. The acquiring institution 104 and the issuing institution 105 are linked by the payment processing system 101. Together, the merchant 103, the acquiring institution 104, the payment processing system 101, and the issuing institution 105 form a payment processing network 101.

In the exemplary operating model of FIG. 1, the payment device 102 provides payment details to a merchant 103 for the payment of an order.

The merchant 103 then generates and communicates an authorization request to the acquiring institution 104. The acquiring institution 104 forwards the request on to the payment processing system 101, which determines which issuing institution 105 is associated with the payment details. In some examples the payment details comprise a primary account number (PAN) (or "funding PAN") that identifies a payment account at the issuing institution. In other examples, the payment details may comprise a token PAN, which the payment processing system is able to map onto a real PAN in order to identify the payment account at the issuing institution (as discussed below). The payment processing system 101 then forwards the authorization request on to the issuing institution 105 for transaction approval.

The term "token PAN" as used herein encompasses a PAN tokenised using a tokenisation system, such as Mastercard's MDES platform, a virtual card number (VCN) or a controlled payment number (CPN).

The issuing institution 105 then checks certain criteria, such as account status, and approves the authorization request if those checks return satisfactory results. This approval is then forwarded on to the acquiring institution 104 via the payment processing system 101. The acquiring institution 104 transmits the approval on to the merchant 103.

Several times each day the acquiring institution 104 produces a data file comprising records of the transactions that have been authorized and completed by the various merchants with which it is associated. These files are then presented to the payment processing system 101 as clearing presentment messages. The clearing presentment messages are modified as determined by the payment processing system 101, for example to deduct relevant fees, and then forwarded to the relevant issuing institutions 105. The receiving institutions then perform a settlement of the transactions indicated in the clearing presentments, in which funds are transferred to the acquiring institutions 104.

In the above described process, the authorization requests and authorization responses typically take the form of a message sent in accordance with a known messaging standard. The authorization messages will typically comprise a plurality of fields, including a payment amount and a payment account identifier (such as a PAN or token PAN). In the present disclosure, the ISO 8583 standard is used as an example of such a messaging standard, though it will be understood by the skilled person that other standards and variations thereof may be used.

In the above described process, the clearing presentments are sent and processed in accordance with a known messaging standard. The clearing presentments typically comprise a plurality of fields, including the payment account identifier. In the present disclosure, the clearing presentment messages take the form of Integrated Product Messages (IPM), as used in the MasterCard Global Clearing Management System (GCMS), though it will be understood by the skilled person that other standards and variations thereof may be used.

Figure 2:
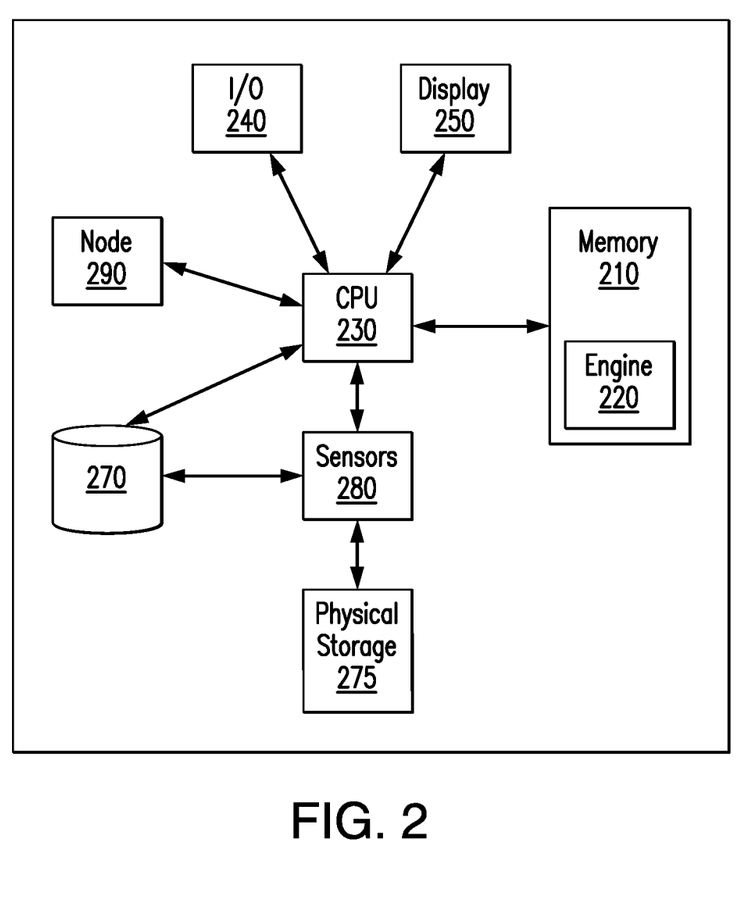
FIG. 2 is a schematic representation of a smart storage device suitable for use in examples of the present disclosure.

FIG. 2 shows a schematic diagram of a smart appliance system 200 that is suitable for accessing an online merchant 103. The smart appliance system 200 generally combines a primary function with computing and communication capabilities; for example, one suitable smart appliance is a smart refrigerator, which combines the physical capability of providing refrigerated storage 275 with computing and communication capabilities.

Another example of a smart storage device is an automobile which uses its fuel tank as a smart storage device, while also having computing and communication capabilities. The smart appliance system 200 comprises memory 210 hosting an engine 220 that implements functionality of the smart appliance 200, a central processing unit (CPU) 230, input/output devices 240, such as a keyboard or speakers, including a display 250 (e.g. a touch screen display). The smart appliance 200 further comprises a communications node, which may be a wireless or wired controller 290 for facilitating and controlling a wireless or wired connection of the smart appliance 200 with a communications network 260, and may further include a smart data storage 270 for maintaining electronically stored details relating to the primary function of the smart appliance, such as details of the contents of a smart refrigerator, and optionally additional informational data (such as one or more operating characteristics of the device; for instance, the operating temperature of a smart refrigerator).

The smart data storage 270 can, for example, be in the form of a database. It can be internal to the smart appliance 200 or external, for example, employed on a server located in the user's dwelling, or remote to the user's dwelling. Smart data can be gathered for storage in the smart data storage 270 through one or more sensors 280 incorporated in the smart appliance 200. For instance the sensors could include RFID tag readers for detecting and recognizing items placed into a physical storage section 175 of a smart refrigerator for storage. Other examples of suitable sensors include QR-code readers, bar-code readers, weight measurement scales, camera, and photo-electric cells.

Figure 3:
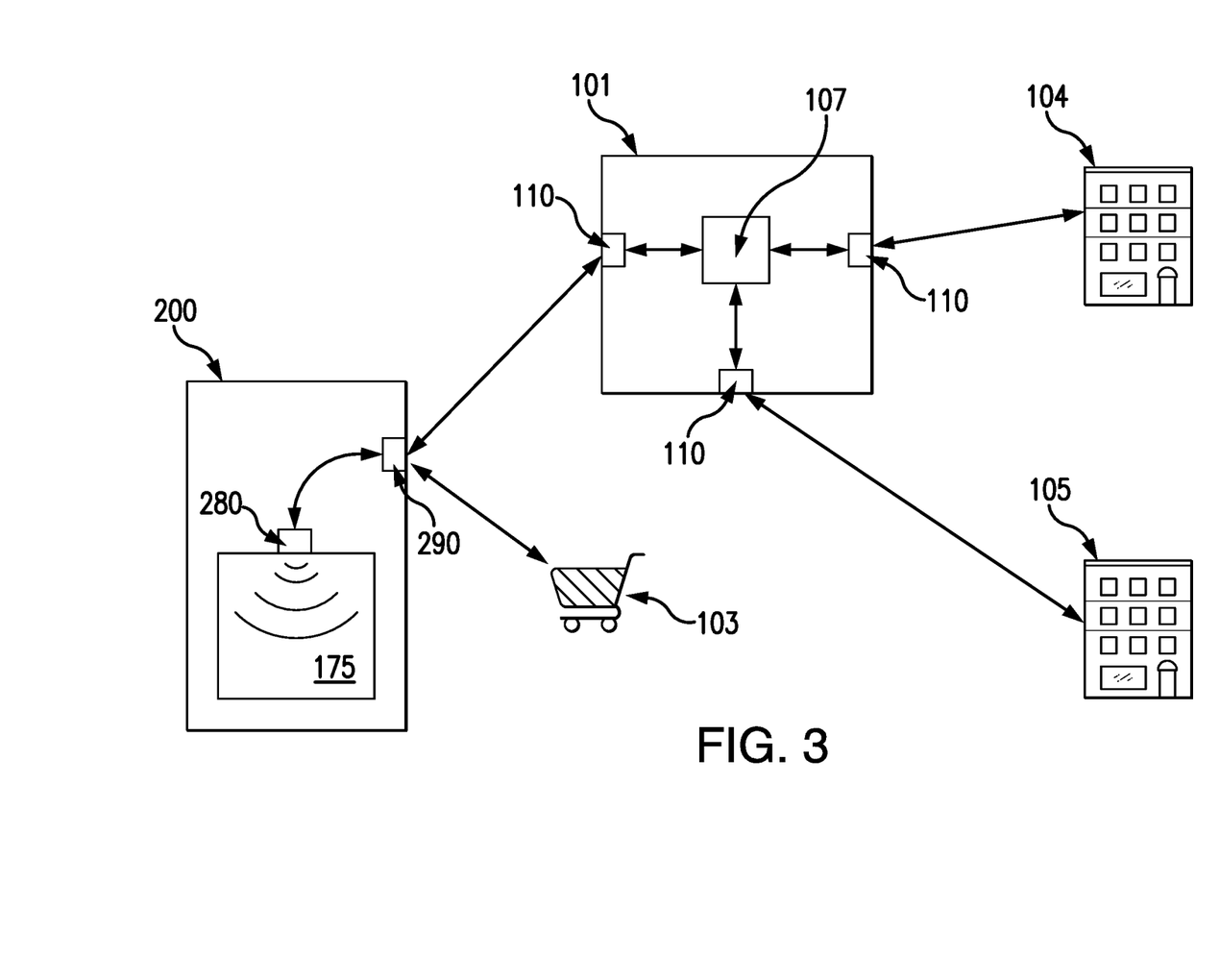
FIG. 3 is a schematic representation of a smart storage device, a payment processing system and two financial institutions in an example of the present disclosure.

FIG. 3 shows a schematic example of part of a system that may be used to perform a method in accordance with the present disclosure. The system comprises a smart storage device 200 and a payment processing system 101 that is in communication with an acquiring institution 104 and an issuing institution 105. The payment processing system 101 comprises at least one communications node 110 that is configured to communicate with the smart storage device 200 via a communications node 290 of the smart storage device 200. The same communications node 110 or further communications nodes 110 are also configured to communicate with the acquiring institution 104 and the issuing institution 105. The payment processing system 101 comprises one or more processors 107 configured to operate the communications nodes 110.

In order to initiate an order, the smart storage device 200 accesses an online store of an online merchant 103 via a web browser or app. Communications between the online merchant 103 and the smart storage device are sent and received using the communication node 290 of the smart storage device 200.

Items for purchase from the online merchant 103 are selected, either by a user or automatically by the smart storage device 200, and the smart storage device 200 provides payment details either to the online merchant 103 or a payment gateway associated with the online merchant 103.

In some examples a user instructs the smart storage device to initiate the order through a user interface, such a touch-screen interface. In other examples the orders are placed at the merchant 103 automatically; the automatic ordering process may be triggered according to a pre-determined criteria, such as the elapse of a given time (e.g. weekly orders) or a sensor of the device detecting that supplies of a product has been depleted of have run out completely.

In some examples, the above described step of placing an order and providing payment details are not performed at the smart storage device 200 and are, instead, performed at a separate computing device.

The payment details include a token PAN that acts as a proxy for the user's payment card. The token PAN may be mapped onto the real PAN of the user by the payment network system during processing of the payment in order to identify the correct payment account belonging to the user. As well as indicating the payment account that the transaction is linked to, a given token PAN may also be set up to provide further information about the transaction for the payment processing system 101. For example, the payment processing system may be aware that a certain token PAN is only permitted to be used in transactions fulfilling certain conditions (such as a maximum transaction amount or payments to a specified merchant) and will block transactions that do not fulfil those conditions. In the present disclosure tokens PANs are used to indicate to the payment network provider that the payment is being made by a payment device that forms part of an integrated payment and storage system and that the payment should be treated in accordance with the methods described in this disclosure; specifically, the token PAN indicates to the payment processing system 101 that the clearing presentment for the transaction should be rejected until the receipt of the order is detected by the by smart storage device 200.

Further details regarding the process of provisioning token PANs associated with smart storage devices are discussed with reference to FIG. 4 below.

After providing payment details to the merchant 103, an authorization message is generated and processed as described with reference to FIG. 1. Upon receipt of a successful authorization message from its acquiring institution, the merchant 103 confirms to the smart storage device 200 that the order has been placed. In some examples, the merchant 200 also provides the smart storage device with data characterizing the items that have been ordered. Examples of characterizing data include RFID-tag data corresponding to an RFID-tag attached to one or more of the items; volume data corresponding to the volume of the item (such as a volume of petroleum), weight data corresponding to the weight of one or more products, number data corresponding to a number of constituent parts of the items, bar-code data corresponding to a bar-code attached to one of the items, QR-code data corresponding to a QR-code tag attached to one of the items. For example, when ordering a fluid, the merchant may specify a volume and a weight of the ordered fluid. In some examples, the smart storage device 200 is configured to detect or measure only certain types characterizing data (for example, RFID data or weight data) and will request data of that type from the merchant 103.

The merchant 103 will provide a list of successful authorizations that have been made (including the authorization for the order) to its acquiring institution at a later point. This may be done, for example, at the end of the day of the authorization. At a still later point (the next day, for example), the acquiring institution will provide the payment processing system 101 with a clearing presentment file comprising a plurality of clearing presentment messages corresponding to authorizations received from its associated merchants.

For standard clearing presentment messages, the payment processing system 101 will perform a number of checks and either reject clearing presentment, or send them on to the issuing institution 104 in a modified form. Other clearing presentment messages, in contrast, are determined to be associated with a value added service (VAS) that specifies that the clearing presentment processing is modified with respect to standard transactions and processed, instead, according to a delayed clearing protocol.

In order to determine whether the presentment messages are to be processed according to the delayed clearing protocol, the payment processing system 101 has access to a database comprising a plurality of token PANs associated with the delayed clearing protocol. The payment processing system 101 then determines that the transaction is to be processed according to the delayed clearing protocol by checking the database to determine whether the token PAN used in the payment is associated with the delayed clearing protocol. In some examples, the payment processing system 101 determines this upon receiving the authorization message (by, for example, using the Authorization DE63 field of the ISO 8585 standard). In other examples, the payment processing system 101 determines this upon receiving the clearing presentment message (by, for example, using the Presentment DE63 field of the IPM).

Upon receiving a clearing presentment message that is determined to be processed according to a delayed clearing protocol scheme, the clearing message presentment then determines whether a message has been received from the smart storage device 200 indicating that the product has been received. If such a message has been received from the smart storage device 200, the clearing presentment is processed as normal. If no such message has been received, the clearing presentment is rejected (that is, an error message is returned to the acquiring institution indicating that the clearing presentment will not be processed).

The process for determining whether a message has been received indicating that the product has been received by the smart storage device 200 may be performed in accordance with one of the two schemes outlined below.

According to the first scheme, the payment processing system 101 determines that the payment should be processed in accordance with the delayed clearing protocol when the authorization message is received. At this point, a record corresponding to the authorization is created in a delay database. When a clearing presentment message is received, the database is checked to determine whether a record for the corresponding authorization exists; if such a record does exist, the clearing presentment is rejected. When a product receipt message is received from the mobile electronic device confirming fulfilment of the order, the record associated with the relevant transaction is then removed from the delay database. A subsequent clearing presentment message will then be allowed, as checking the delay database for the corresponding authorization will no longer return a match.

According to the second scheme, the payment processing system 101 may determine that that the payment should be processed in accordance with the delayed clearing protocol when the clearing presentment message is received. According to this protocol, upon receiving the clearing presentment message the payment processing system 101 calls the smart storage device 200 for confirmation that the product has been received. Processing of the clearing presentment is only continued if such confirmation is received from the smart storage device 200 and is otherwise rejected.

The smart storage device 200 is provided with at least one sensor configured to detect or measure data corresponding to the characterizing data provided by the merchant 103. In some examples, the smart storage device 200 is further configured to generate and send a receipt message to the payment processing system 101 upon receipt of the items ordered. In other examples, the smart storage device confirms or denies receipt of the items in response to a call from the payment processing system 101. Receipt of the items ordered is detected by comparing data measured by its at least one sensor with the characterizing data provided by the merchant 103. For example, the merchant may have provided data characterizing an RFID-tag on the ordered item; upon detecting using an RFID-reader an RFID-tag corresponding with the characterizing data, the smart storage device 200 will send a message to the payment processing 101 confirming receipt of the order.

Figure 4:
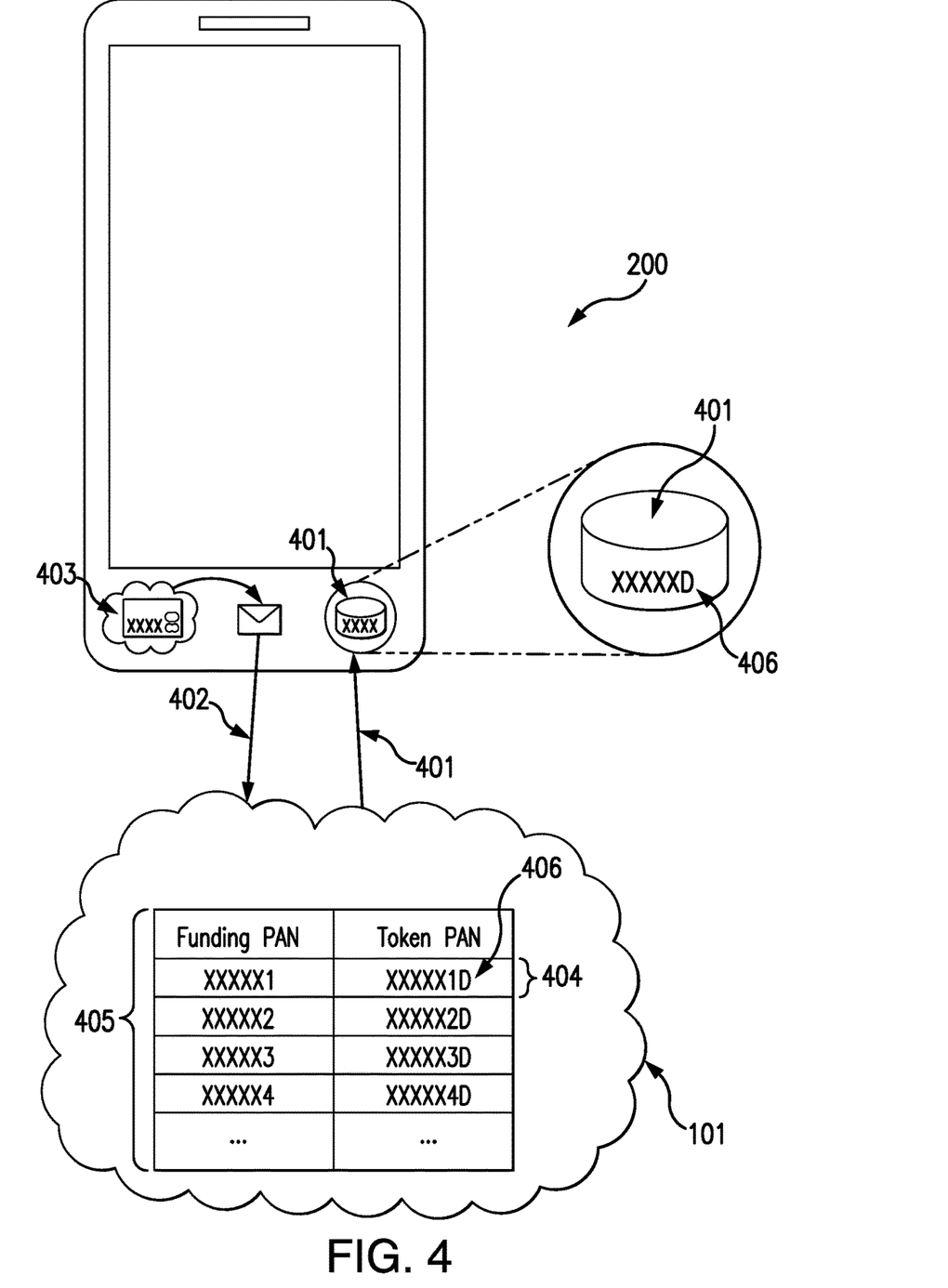
FIG. 4 is a schematic representation of a tokenization process according to an example of the present disclosure.

FIG. 4 shows a schematic representation of token PAN provisioning according to some examples of the present disclosure.

On initiating an order, the smart storage device 200 sends a token PAN provisioning request 402 to the payment processing system 101.

The token PAN provisioning request 402 comprises a PAN associated with a payment card (the 'funding PAN'). The token PAN provisioning message 402 indicates to the payment processing system 101 that the generated token PAN should be associated with a payment card 403 by the payment processing system 101. The payment processing system 101 creates a record 404 in a token database 405 linking the token PAN with the payment card.

The smart storage device 200 also provides an indication 406 to the payment processing system 101 that transactions made using the token PAN should be processed according to the delayed clearing protocol. The indication may comprise data that is sent separately from the token PAN 401. Alternatively, the token PAN 401 may be generated in a form that is understood to be associated with the delayed clearing protocol. For example, token PAN's in which the first four digits lie within the range 5550-5559, say, may be reserved for use in delayed clearing protocol transactions.

Thus, when the payment processing system 101 receives an authorisation request or clearing presentment having the token PAN, the payment processing system 101 is able to map the token PAN onto a payment card 403 (which was identified to the payment processing system 101 on generation of the token PAN) and is able to determine that the authorisation request or clearing presentment message belongs to a category of transactions to be processed according to the delayed clearing protocol.

In response to the token PAN provisioning request, the payment processing system 101 returns a message comprising a token PAN 401, which may be a series of numbers formatted in accordance with the PAN field of an authorization message in accordance with a messaging standard.

In some examples, a token PAN 401 is used to make payment in relation to several different orders. In one such example, the token PAN 401 may be generated on placing a first order. Subsequent orders using the same token PAN 401 would not require a step of generating a new token PAN. In another example, the token PAN 401 may be generated when the device is first registered to a user.

Figure 5:
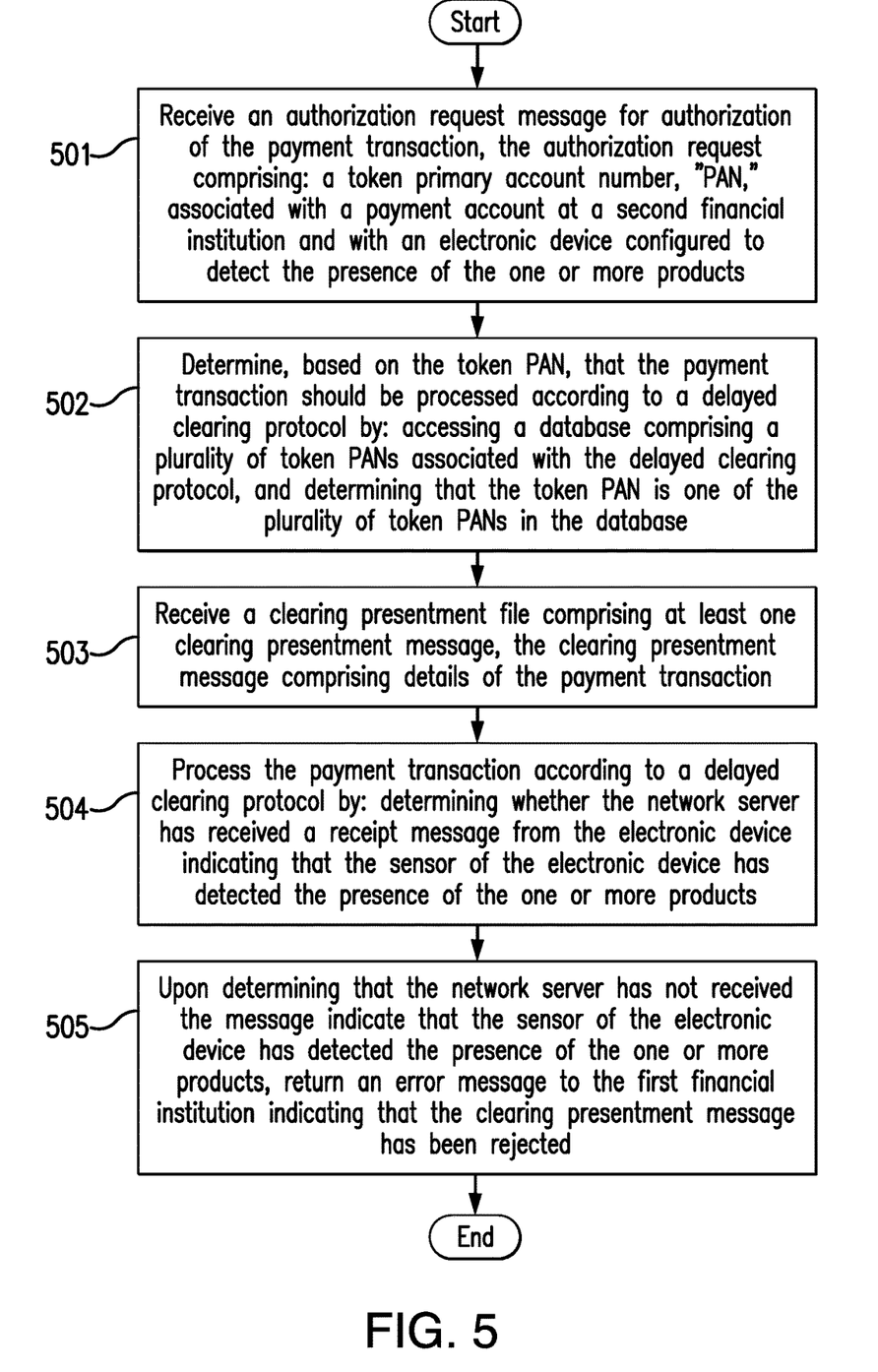
FIG. 5 is a flow diagram of a method according to the present disclosure.

FIG. 5 shows a flow diagram illustrating steps in a method of the present disclosure performed by a network server of the payment processing network 101.

In step 501, the network server receives an authorization request message from the acquiring institution 104 for authorization of a payment transaction. The authorization request comprises: a token primary account number, PAN, associated with a payment account at a second financial institution and with an electronic device configured to detect the presence of the one or more products.

In step 502, the network server determines, based on the token PAN, that the payment transaction should be processed according to a delayed clearing protocol. To do this, the network server accesses a database comprising a plurality of token PANs associated with the delayed clearing protocol and determines that the token PAN is one of the plurality of token PANs in the database.

In step 503, the network server receives a clearing presentment file comprising at least one clearing presentment message from a server of the first financial institution. The clearing presentment message comprises details of a transaction to be processed for payment from the second financial institution to the first financial institution.

The network server then proceeds to process the payment transaction according to a delayed clearing protocol.

In step 504, the network server determines whether the network server has received a receipt message from the electronic device indicating that the sensor of the electronic device has detected the presence of the one or more products.

In step 505, upon determining that the network server has not received the message indicating that the sensor of the electronic device has detected the presence of the one or more products, the network server returns an error message to the first financial intuition indicating that the clearing presentment message has been rejected.

An example illustrating a transaction processed in accordance with the present disclosure is as follows.

A smart refrigerator places an order for milk at the online store of a local supermarket. When placing the order, a token PAN associated with the delayed clearing protocol is generated and provided to the payment portal of the local supermarket. On confirmation of the authorization of the purchase, the order is accepted by the supermarket and a RFID code and weight corresponding to the milk are provided to the smart refrigerator.

Subsequently, the acquiring institution associated with the merchant submits a clearing presentment file to the payment processing network 101 including a presentment message for the order of milk.

On receiving the payment presentment message, the payment network provider checks whether confirmation of the arrival of the order of milk has been received. If confirmation has not been received, the payment processing network rejects the payment presentment message and sends an error message to the acquiring institution.

A day later, the order of milk is received and the carton of milk is placed into the physical storage section of the smart refrigerator. An RDIF-reader in the smart refrigerator detects an RFID-tag on the milk carton corresponding to the RFID-code provided by the supermarket, and a weight sensor in the smart refrigerator detects the addition of an object to the physical storage section having a weight corresponding to the weight provided by the supermarket. The smart refrigerator therefore considers itself to have detected the carton of milk.

On detection of the carton of milk, the smart refrigerator sends a confirmation message to the payment processing network confirming receipt of the order.

A further clearing presentment file is sent by the acquiring institution, the further clearing presentment file including the previously rejected clearing presentment message for the order of milk.

On determining that the message confirming receipt of the order has been received from the smart refrigerator, the payment processing network proceeds to process the clearing presentment message according to a standard procedure, such as that described with reference to FIG. 1.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A computer-readable storage medium includes, but is not limited to, volatile memory, non-volatile memory, magnetic and optical storage devices such as disk drives, magnetic tape, CDs (compact discs), DVDs (digital versatile discs), or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

Receivers and transmitters as described herein may be standalone or may be comprised in transceivers. User input devices can include, without limitation, microphones, buttons, keypads, touchscreens, touchpads, trackballs, joysticks and mice. User output devices can include, without limitation, speakers, graphical user interfaces, indicator lights and refreshable braille displays. User interface devices can comprise one or more user input devices, one or more user output devices, or both.

The invention claimed is:

1. A method of processing a payment transaction for an order for one or more products, comprising:

receiving, by a network server from a server of a first financial institution, an authorization request message for authorization of a payment transaction concerning an order for one or more products from a smart storage device comprising one or more sensors, the authorization request message comprising a token primary account number (PAN) associated with a payment account at a second financial institution;

determining, by the network server based on the token PAN, that the payment transaction should be processed according to a delayed clearing protocol, wherein the delayed clearing protocol involves delaying payment processing until the order is successfully received by the smart storage device, by:

accessing a database comprising a plurality of token PANs associated with the delayed clearing protocol, and determining that the token PAN is one of the plurality of token PANs in the database;

receiving, by the network server from the server of the first financial institution, a clearing presentment file comprising at least one clearing presentment message, the clearing presentment message comprising details of the payment transaction;

determining, by the network server, that a receipt message from the smart storage device has not been received, wherein receipt messages from the smart storage device indicate the presence of products corresponding to respective orders as being detected by the one or more sensors of the smart storage device;

transmitting, by the network server, an error message to the first financial institution server indicating that the clearing presentment message has been rejected;

receiving, by the network server, a receipt message from the smart storage device indicating detection of the presence of the one or more products;

sending, by the network server to the server of the first financial institution, a confirmation message requesting that the payment transaction be included in a further clearing presentment message;

receiving, by the network server from the server of the first financial institution, a further clearing presentment file comprising the further clearing presentment message, wherein the further clearing presentment message comprises details of the payment transaction; and sending, by the network server, the further clearing presentment file to a server of the second financial institution for settlement.

2. The method of claim 1, further comprising, subsequent to receiving, by the network server, the receipt message from the smart storage device indicating that the sensor has detected the presence of the order for the one or more products:

sending, by the network server, the clearing presentment message to the server of the second financial institution.

3. A system for processing a payment transaction for an order for one or more products, comprising:

a network server comprising at least one processor and a memory;

a first financial institution server operably connected to the network server;

a second financial institution server operably connected to the network server;

a smart storage device comprising one or more sensors, the smart storage device operably connected to the network server; and a database operably connected to the network server, wherein the database comprises a plurality of token primary account numbers (PANs) associated with a delayed clearing protocol;

wherein the memory of the network server comprises instructions which when executed cause the processor of the network server to:

receive an authorization request message from the first financial institution server for authorization of a payment transaction concerning an order for one or more products by the smart storage device, the authorization request message comprising a token primary account number (PAN) associated with a payment account at the second financial institution;

determine, based on the token PAN, that the payment transaction should be processed according to a delayed clearing protocol, wherein the delayed clearing protocol involves delaying payment processing until the order is successfully received by the smart storage device, by:

accessing the database comprising the plurality of token PANs associated with the delayed clearing protocol, and determining that the token PAN matches one of the plurality of token PANs in the database;

receive a clearing presentment file from the server of the first financial institution, the clearing presentment file comprising at least one clearing presentment message comprising details of the payment transaction;

determine that a receipt message from the smart storage device has not been received, wherein receipt messages from the smart storage device indicate the presence of products corresponding to respective orders as being detected by the one or more sensors of the smart storage device;

transmit an error message to the first financial intuition indicating that the clearing presentment message has been rejected;

receive a receipt message from the smart storage device indicating detection of the presence of the products;

send a confirmation message to the server of the first financial institution, the confirmation message requesting that the payment transaction be included in a further clearing presentment message;

receive a further clearing presentment file comprising the further clearing presentment message from the server of the first financial institution, wherein the further clearing presentment message comprises details of the payment transaction; and send the further clearing presentment file to a server of the second financial institution for settlement.

4. The system of claim 3, wherein the memory of the network server comprises further instructions, subsequent to the instructions for receiving the receipt message from the smart storage device indicating that the sensor has detected the presence of the one or more products:

send the clearing presentment message to the server of the second financial institution.

* * * * *